(12) United States Patent
Sollis (10) Patent No.: US 12,471,725 B2
(45) Date of Patent: Nov. 18, 2025

(54) BEVERAGE BOTTLE HOLDING DEVICE (71) Applicant: James Sollis, Danville, IL (US)

(72) Inventor: James Sollis, Danville, IL (US)

( * ) Notice: Subject to any disclaimer, the term of this patent is extended or adjusted under 35 U.S.C. 154(b) by 0 days.

(21) Appl. No.: 18/629,505

(22) Filed: Apr. 8, 2024

(65) Prior Publication Data

US 2025/0311870 A1  Oct. 9, 2025

(51) Int. Cl.
A47G 23/02 (2006.01)
B65D 21/02 (2006.01)
B67B 7/18 (2006.01)

(52) U.S. Cl.
CPC ..... A47G 23/0241 (2013.01); B65D 21/0213 (2013.01); B67B 7/18 (2013.01)

(58) Field of Classification Search
CPC ... A47G 23/0241; B65D 21/0213; B67B 7/18
USPC .................... 220/737; 81/3.15, 3.4
See application file for complete search history.

(56) References Cited

U.S. PATENT DOCUMENTS

| 937,850 | A | * | 10/1909 | Parker | A47G 23/03 |
| | | | | | 248/346.11 |
| 2,784,577 | A | | 3/1957 | Beaham, III | |
| 3,393,892 | A | | 7/1968 | Buck | |
| 3,760,657 | A | * | 9/1973 | Muir | B67B 7/18 |
| | | | | | D8/18 |
| 3,808,084 | A | * | 4/1974 | Doty | A47G 23/03 |
| | | | | | 428/167 |
| 4,798,300 | A | * | 1/1989 | Ghosh | B65D 1/0269 |
| | | | | | 206/508 |
| 4,829,618 | A | * | 5/1989 | McKee | B67B 7/403 |
| | | | | | 248/346.11 |
| D311,477 | S | | 10/1990 | Fallgatter | |
| 8,087,528 | B1 | | 1/2012 | Scarlett | |
| 2006/0016294 | A1 | * | 1/2006 | McGrath | B65D 81/3876 |
| | | | | | 81/3.15 |
| 2007/0012140 | A1 | * | 1/2007 | Howlett | B67B 7/403 |
| | | | | | 81/3.09 |
| 2007/0012706 | A1 | * | 1/2007 | Deadman | B65D 81/3879 |
| | | | | | 220/737 |
| 2012/0211629 | A1 | | 8/2012 | Shaw | |
| 2018/0008073 | A1 | | 1/2018 | Goodnow | |
| 2020/0390658 | A1 | | 12/2020 | Williams | |

FOREIGN PATENT DOCUMENTS

WO WO2012115735 8/2012

* cited by examiner

Primary Examiner — James N Smalley (57) ABSTRACT

A beverage bottle holding device includes a cylindrical container portion, a stabilizing base portion, and a support plate. The cylindrical container portion is designed to hold a beverage bottle. The stabilizing base portion is positioned at the bottom of the container portion and projects beyond the outer surface of the container portion. The base portion includes an orifice that includes a gripping structure on the interior surface thereof, which is designed to engage an outer surface of a screw cap of a beverage bottle to permit a user to at least partially unscrew the screw cap. The support plate is positioned in the container portion on top of the base portion and covering one side of the orifice.

12 Claims, 7 Drawing Sheets

BEVERAGE BOTTLE HOLDING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to beverage bottle holders and coasters and more particularly pertains to a new beverage bottle holding device that does not easily tip over and assists a user in opening a screw cap of a beverage bottle, such as a plastic bottle for water, juices, soft drinks, and sports drinks.

(2) Description of Related Art Including Information Disclosed Under 37 CFR 1.97 and 1.98

The prior art relates to beverage bottle holders and coasters. The prior art, as best understood, does not disclose a beverage bottle holding device that includes a cylindrical container portion and a stabilizing base portion positioned at the bottom of the container portion and projecting beyond the outer surface of the container portion, wherein the base portion includes an orifice that includes a gripping structure to permit a user to at least partially unscrew a screw cap of a beverage bottle.

BRIEF SUMMARY OF THE INVENTION

An embodiment of the disclosure meets the needs presented above in a beverage bottle holding device generally comprising a cylindrical container portion, a stabilizing base portion, and a support plate. The cylindrical container portion is designed to hold a beverage bottle. The stabilizing base portion is positioned at the bottom of the container portion and projects beyond the outer surface of the container portion. The base portion includes an orifice that includes a gripping structure on the interior surface thereof, which is designed to engage an outer surface of a screw cap of a beverage bottle to permit a user to at least partially unscrew the screw cap. The support plate is positioned in the container portion on top of the base portion and covering one side of the orifice.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new beverage bottle holding device embodying the principles and concepts of an embodiment of the disclosure and generally designated by the reference numeral 10 will be described.

Figure 4:
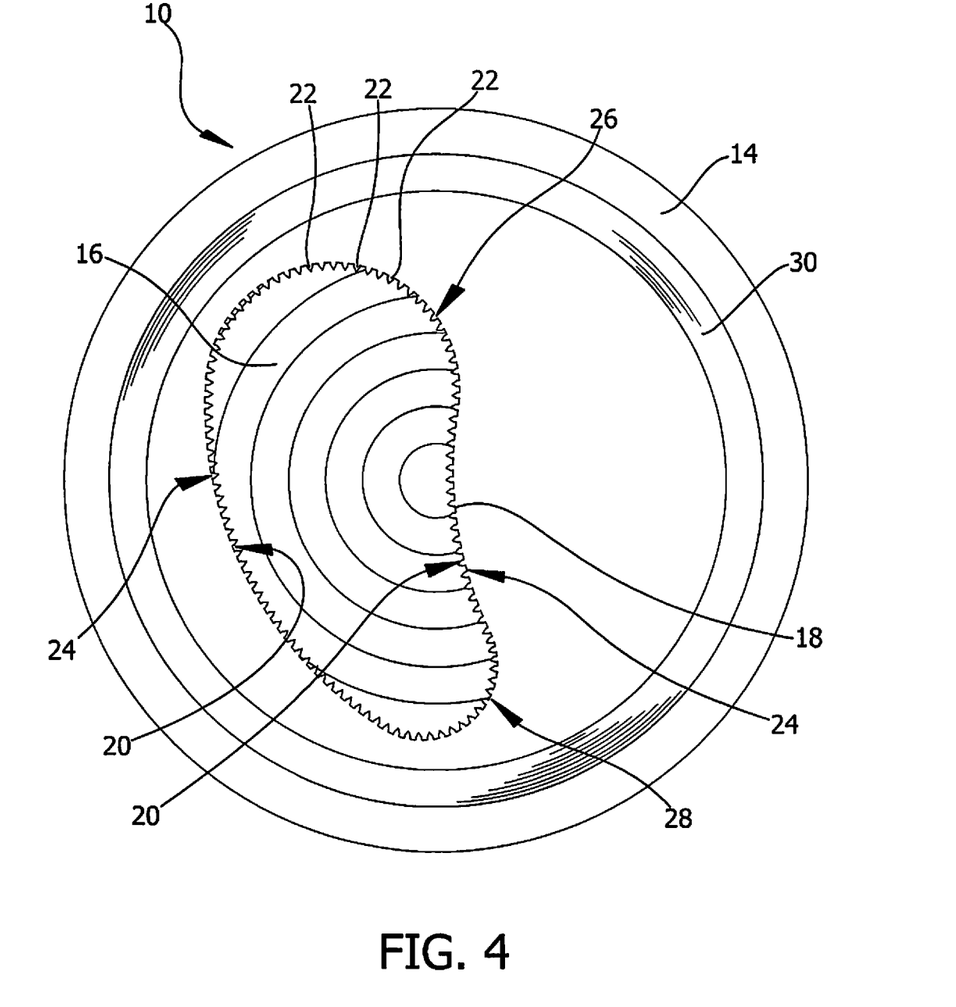
FIG. 4 is a bottom view of an embodiment of the disclosure.
Figure 5:
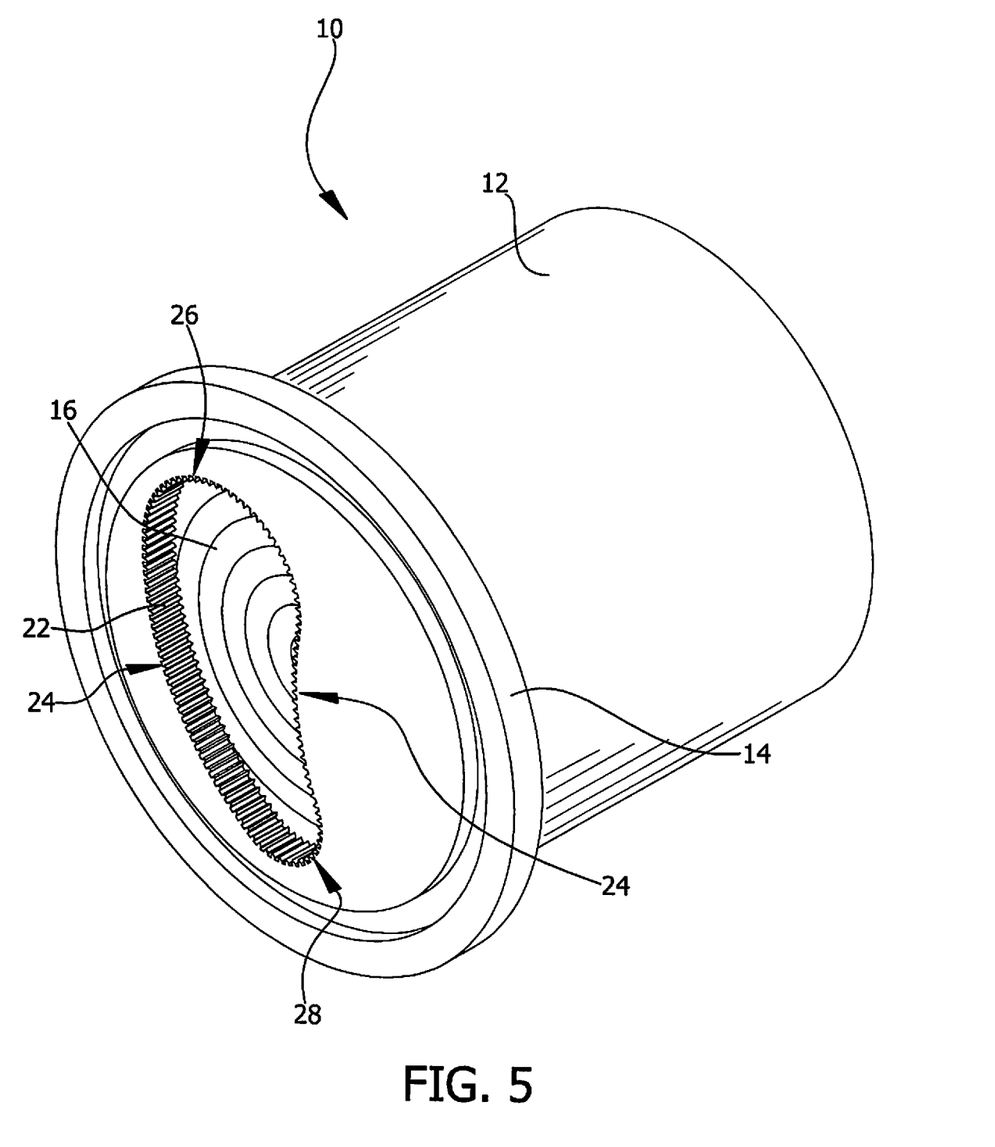
FIG. 5 is a bottom perspective view of an embodiment of the disclosure.
Figure 6:
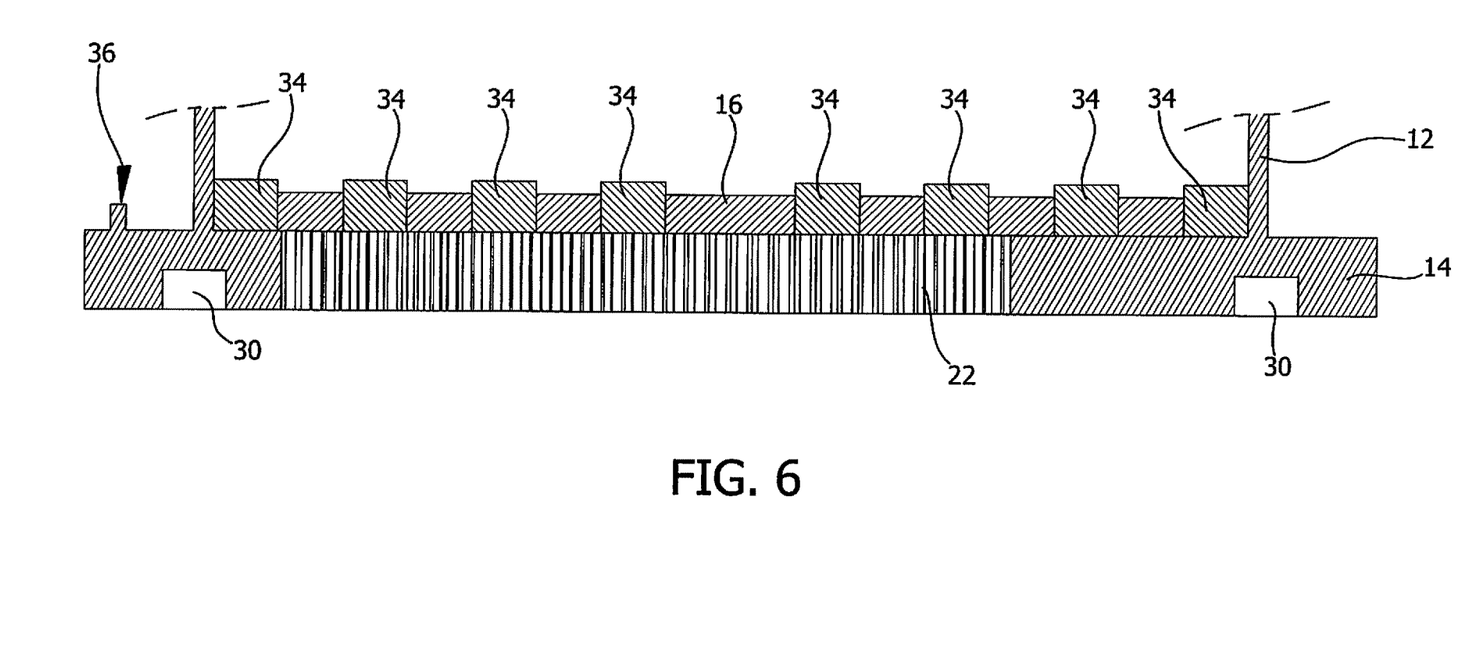
FIG. 6 is a cross-sectional view of an embodiment of the disclosure.
Figure 7:
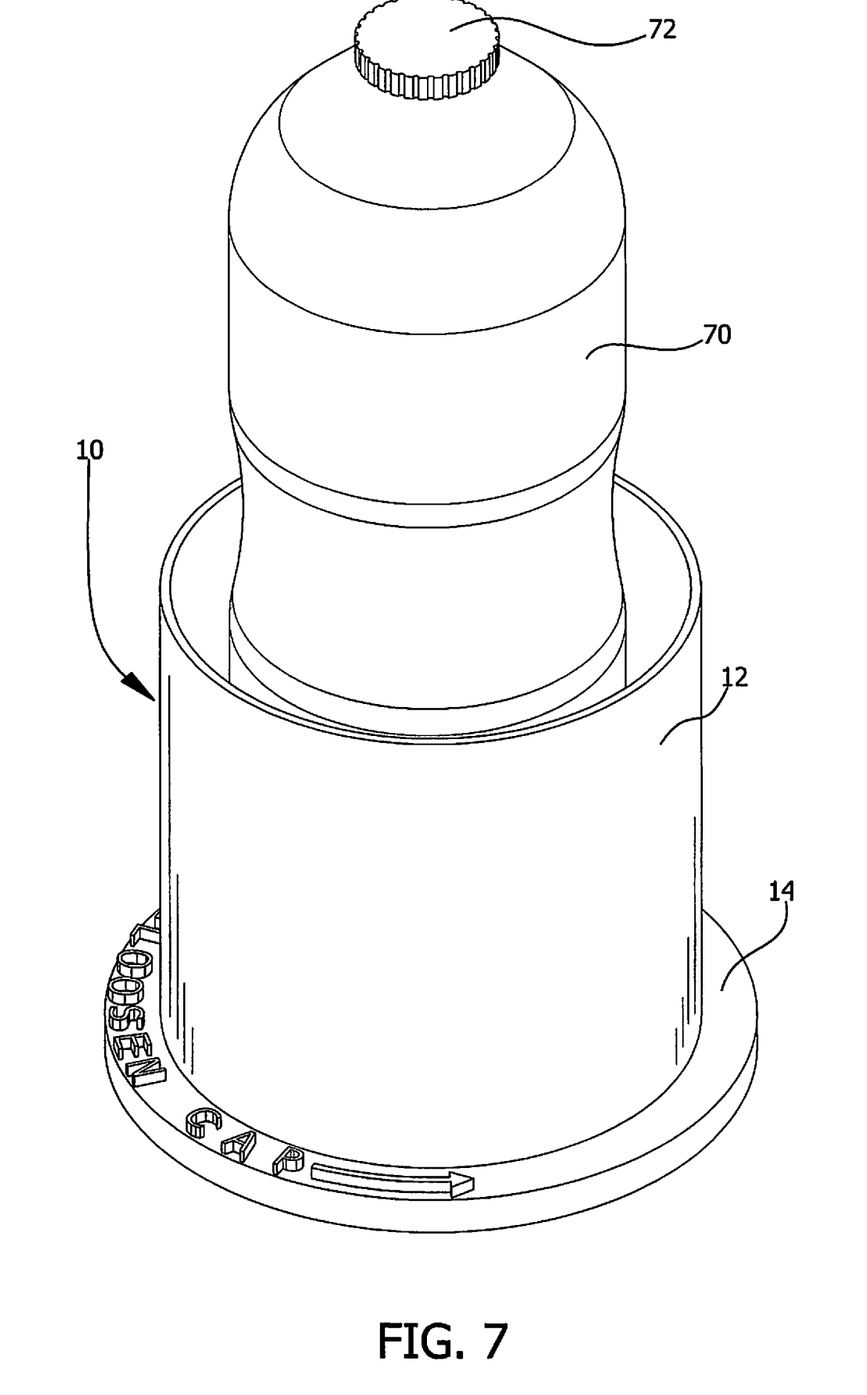
FIG. 7 is a top perspective view of an embodiment of the disclosure in use.
Figure 8:
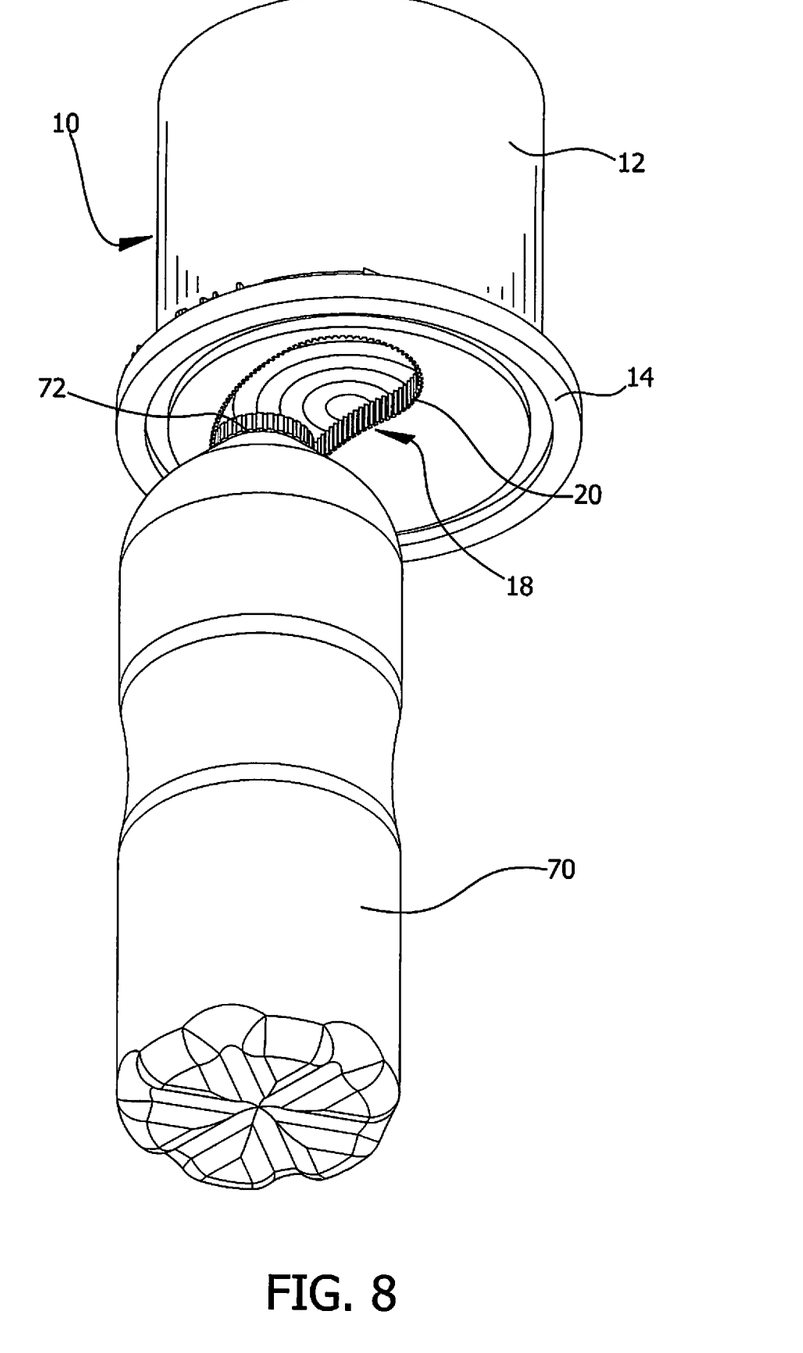
FIG. 8 is a bottom perspective view of an embodiment of the disclosure in use.

As best illustrated in FIGS. 1 through 8, the beverage bottle holding device 10 generally comprises a cylindrical container portion 12, a stabilizing base portion 14, and a support plate 16. The cylindrical container portion 12 is designed to hold a beverage bottle 70, as shown in FIG. 7. The stabilizing base portion 14 is positioned at the bottom of the container portion 12 and projects beyond the outer surface of the container portion 12. The base portion 14 includes an orifice 18 that includes a gripping structure 20 on the interior surface thereof, which is designed to engage an outer surface of a screw cap 72 of the beverage bottle 70 to permit a user to at least partially unscrew the screw cap, as shown in FIG. 8. As best seen in FIGS. 5 and 6, the support plate 16 is positioned in the container portion 12 on top of the base portion 14 and covering one side of the orifice 18.

The gripping structure 20 includes a plurality of teeth 22, though another type of gripping structure, such as a rubber or elastomer, could be used. The orifice 18 is slot-shaped and has two elongated sides 24 connecting a first curved end portion 26 to a second curved end portion 28. The orifice 18 tapers in width from the first curved end portion 26 to the second curved end portion 28 to permit engagement with screw caps 72 of different diameters. Each of the two elongated sides 24 is curved, though they could also be straight. In use, as shown in FIG. 8, a user could insert the screw cap 72 of the beverage bottle 70, such as a plastic bottle, into the first or second curved end portions 26, 28, depending on which fits the screw cap 72 best, and then could rotate the beverage bottle holding device 10 to at least start unscrewing the screw cap 72.

Figure 1:
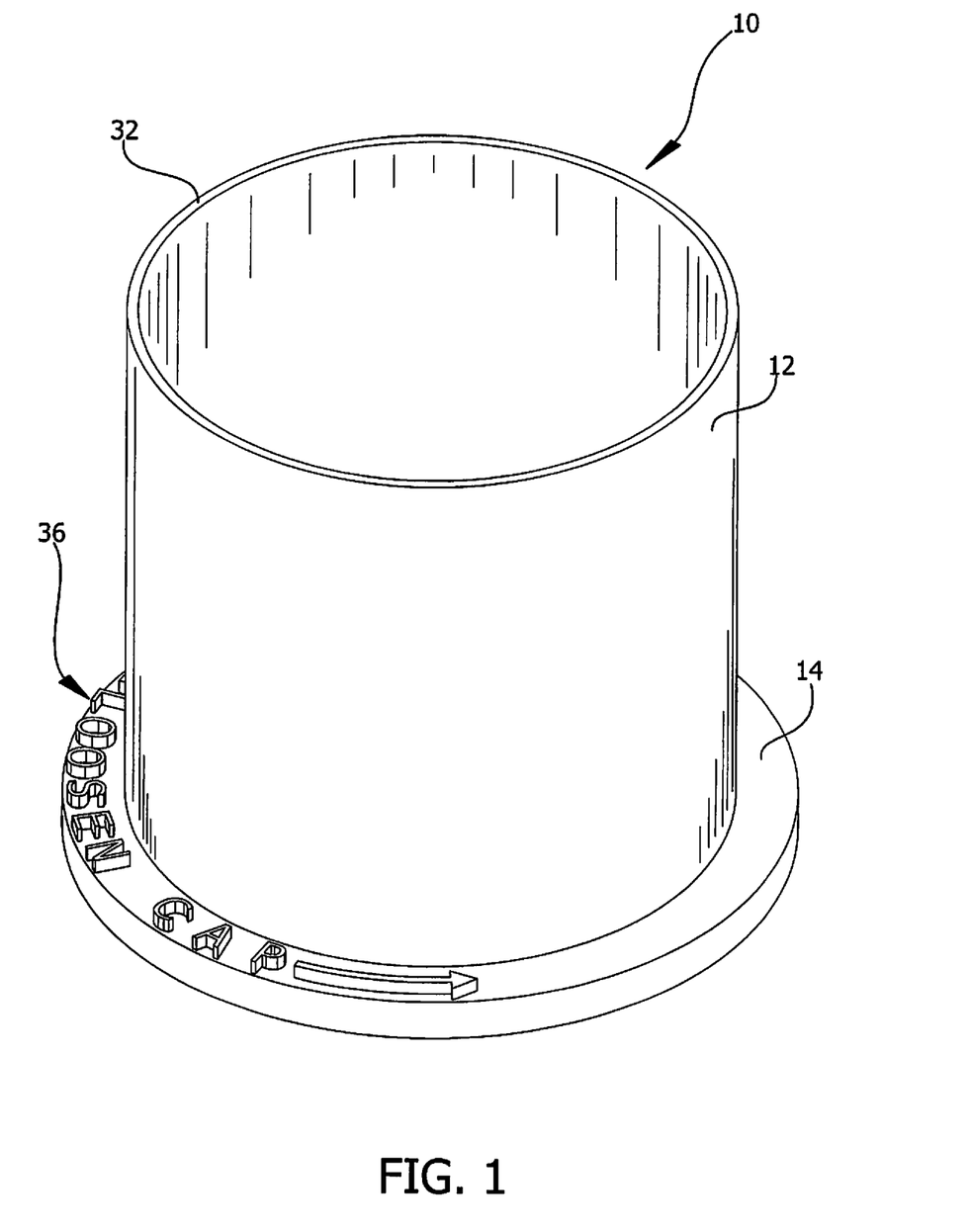
FIG. 1 is a top perspective view of a beverage bottle holding device according to an embodiment of the disclosure.
Figure 2:
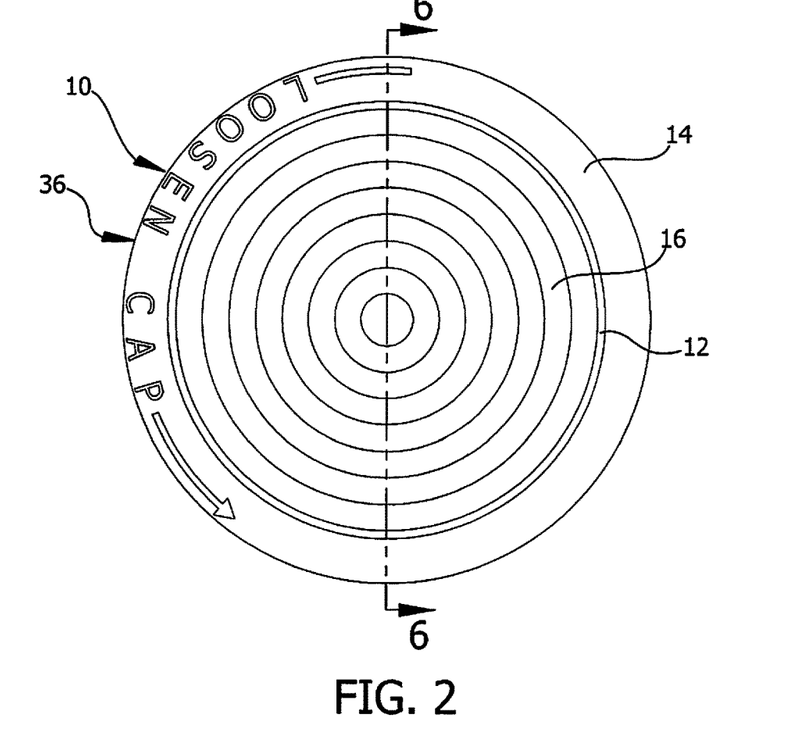
FIG. 2 is a top view of an embodiment of the disclosure.
Figure 3:
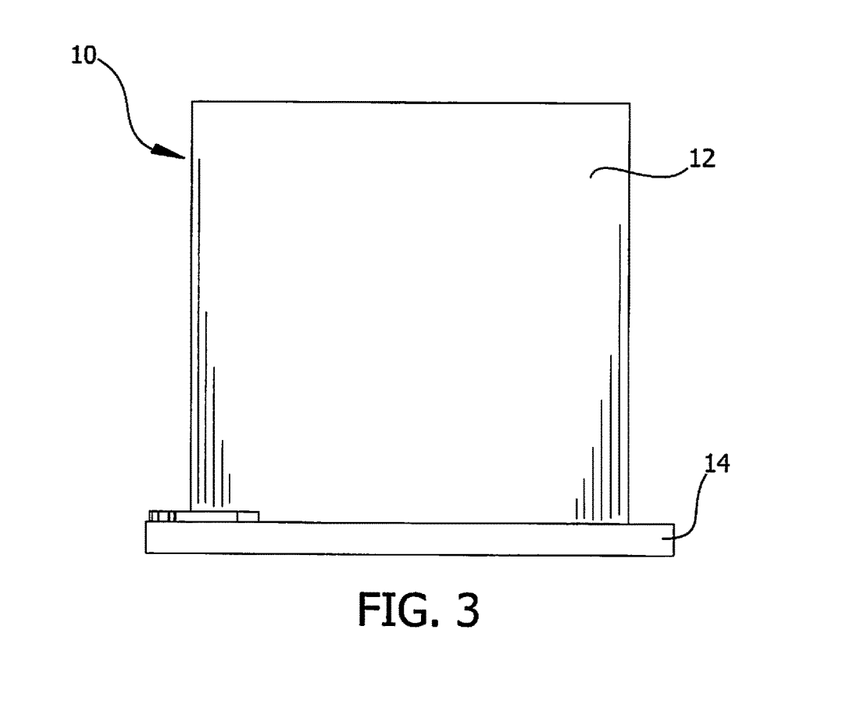
FIG. 3 is a side view of an embodiment of the disclosure.

The base portion 14 is a circular disk formed integrally with the container portion 12, as best seen in FIG. 6. As best seen in FIGS. 4 through 6, the base portion 14 includes a groove 30 having a similar shape and diameter as an upper lip 32 of the container portion 12, which groove 30 is positioned to surround the orifice 18. The groove 30 permits the beverage bottle holding device 10 to be stacked on another beverage bottle holding device 10 for storage. As best seen in FIGS. 2 and 6, the support plate 16 includes a plurality of raised concentric rings 34 to support a bottom surface of the beverage bottle 70. As best seen in FIGS. 1 and 7, printed information 36 such as words and an arrow can be included on the base portion 14, either printed or as raised text formed as part of the base portion 14, to help remind a user which way to rotate the beverage bottle holding device 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A beverage bottle holding device comprising:
a cylindrical container portion configured to hold a beverage bottle;
a stabilizing base portion disposed at the bottom of the container portion and projecting beyond the outer surface of the container portion, wherein said base portion comprises an orifice comprising a gripping structure on the interior surface thereof configured to engage an outer surface of a screw cap of a beverage bottle to permit a user to at least partially unscrew the screw cap;
a support plate disposed in said container portion on top of said base portion and covering one side of said orifice; and
wherein said base portion comprises a groove having a similar shape and diameter as an upper lip of said container portion to permit the beverage bottle holding device to be stacked on another beverage bottle holding device.

2. The beverage bottle holding device of claim 1, wherein said orifice is slot-shaped and has two elongated sides connecting a first curved end portion to a second curved end portion, and said orifice tapers in width from said first curved end portion to said second curved end portion to permit engagement with screw caps of different diameters.

3. The beverage bottle holding device of claim 2, wherein each of said two elongated sides is curved.

4. The beverage bottle holding device of claim 3, wherein said gripping structure comprises a plurality of teeth.

5. A beverage bottle holding device comprising:
a cylindrical container portion configured to hold a beverage bottle;
a stabilizing base portion disposed at the bottom of the container portion and projecting beyond the outer surface of the container portion, wherein said base portion comprises an orifice comprising a gripping structure on the interior surface thereof configured to engage an outer surface of a screw cap of a beverage bottle to permit a user to at least partially unscrew the screw cap, wherein said gripping structure comprises a plurality of teeth;
a support plate disposed in said container portion on top of said base portion and covering one side of said orifice;
wherein said orifice is slot-shaped and has two elongated sides connecting a first curved end portion to a second curved end portion, and said orifice tapers in width from said first curved end portion to said second curved end portion to permit engagement with screw caps of different diameters,
wherein each of said two elongated sides is curved; and
wherein said base portion comprises a groove having a similar shape and diameter as an upper lip of said container portion to permit the beverage bottle holding device to be stacked on another beverage bottle holding device.

6. The beverage bottle holding device of claim 5, wherein said base portion is a circular disk formed integrally with said container portion.

7. The beverage bottle holding device of claim 6, wherein said support plate comprises a plurality of raised concentric rings to support a bottom surface of a beverage bottle.

8. The beverage bottle holding device of claim 1, wherein said gripping structure comprises a plurality of teeth.

9. The beverage bottle holding device of claim 1, wherein said groove is disposed to surround said orifice.

10. The beverage bottle holding device of claim 1, wherein said base portion is a circular disk formed integrally with said container portion.

11. The beverage bottle holding device of claim 1, wherein said support plate comprises a plurality of raised concentric rings to support a bottom surface of a beverage bottle.

12. A beverage bottle holding device comprising:
a cylindrical container portion configured to hold a beverage bottle;
a stabilizing base portion disposed at the bottom of the container portion and projecting beyond the outer surface of the container portion, wherein said base portion comprises an orifice comprising a gripping structure on the interior surface thereof configured to engage an outer surface of a screw cap of a beverage bottle to permit a user to at least partially unscrew the screw cap, wherein:

said orifice is slot-shaped and has two elongated sides connecting a first curved end portion to a second curved end portion, said orifice tapers in width from said first curved end portion to said second curved end portion to permit engagement with screw caps of different diameters, each of said two elongated sides is curved, said gripping structure comprises a plurality of teeth, said base portion comprises a groove having a similar shape and diameter as an upper lip of said container portion to permit the beverage bottle holding device to be stacked on another beverage bottle holding device, said groove is disposed to surround said orifice, and said base portion is a circular disk formed integrally with said container portion; and a support plate disposed in said container portion on top of said base portion and covering one side of said orifice, wherein said support plate comprises a plurality of raised concentric rings to support a bottom surface of a beverage bottle.

* * * * *